Dec. 5, 1961   J. P. HALADA   3,011,244
APPARATUS FOR PRODUCING EXPANDED METAL
Filed March 16, 1959   2 Sheets-Sheet 1
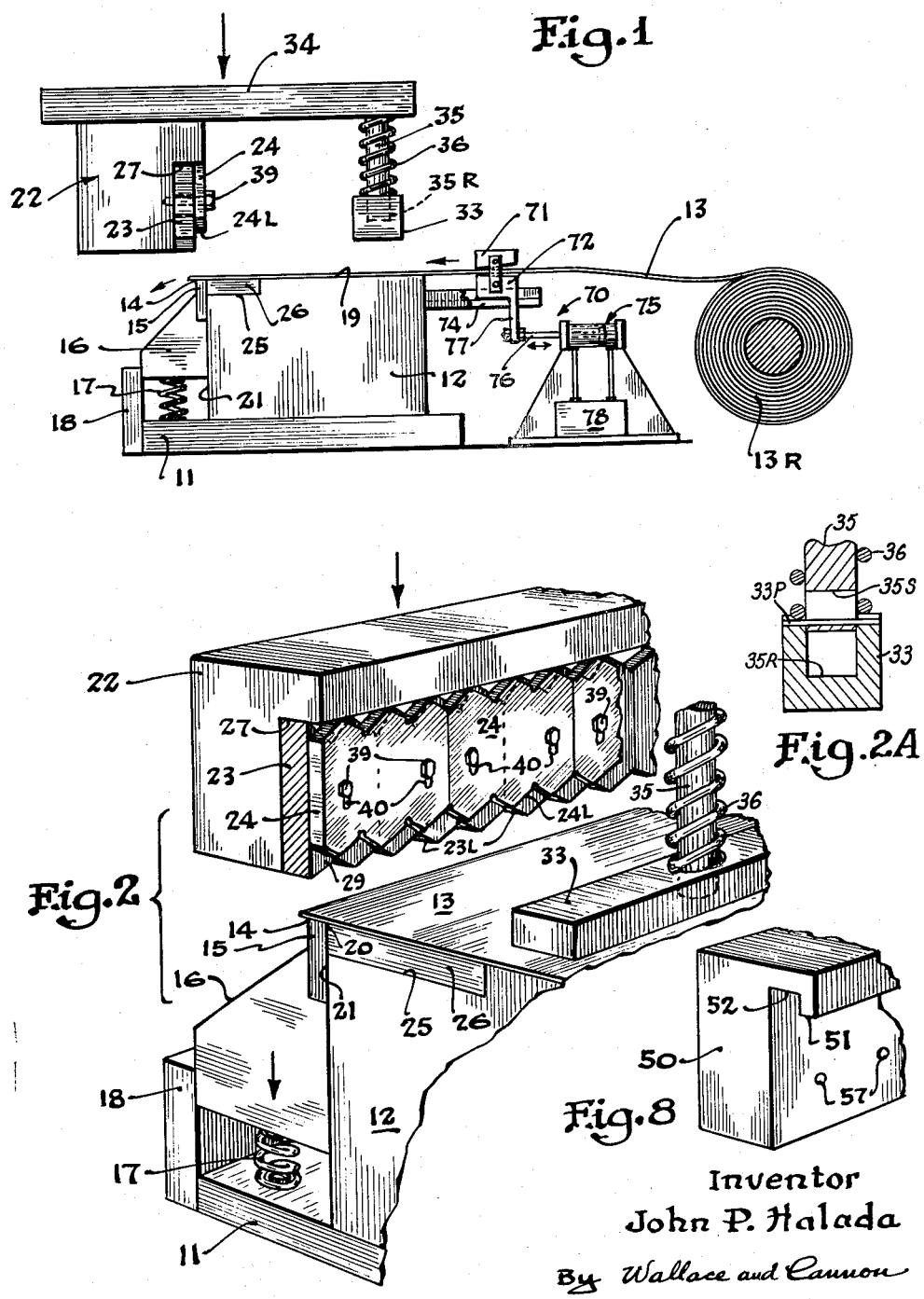
Inventor
John P. Halada
By Wallace and Cannon
Attorneys Dec. 5, 1961 J. P. HALADA 3,011,244
APPARATUS FOR PRODUCING EXPANDED METAL
Filed March 16, 1959 2 Sheets-Sheet 2
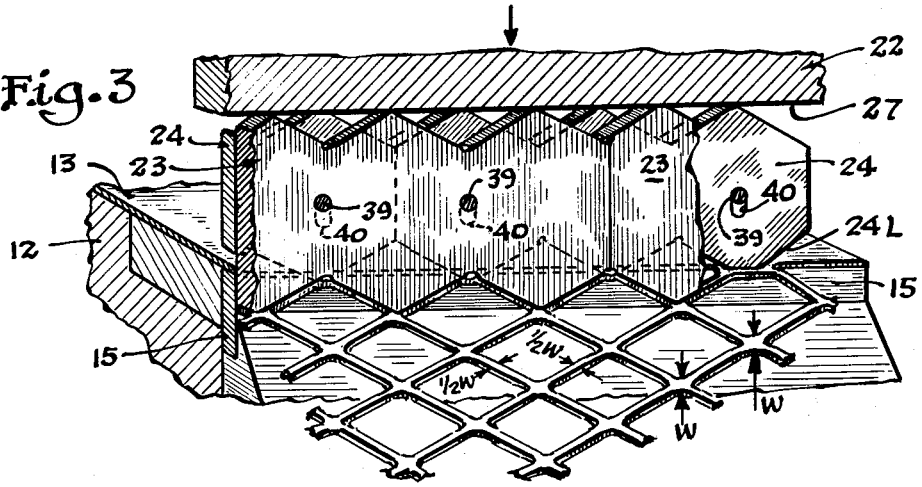
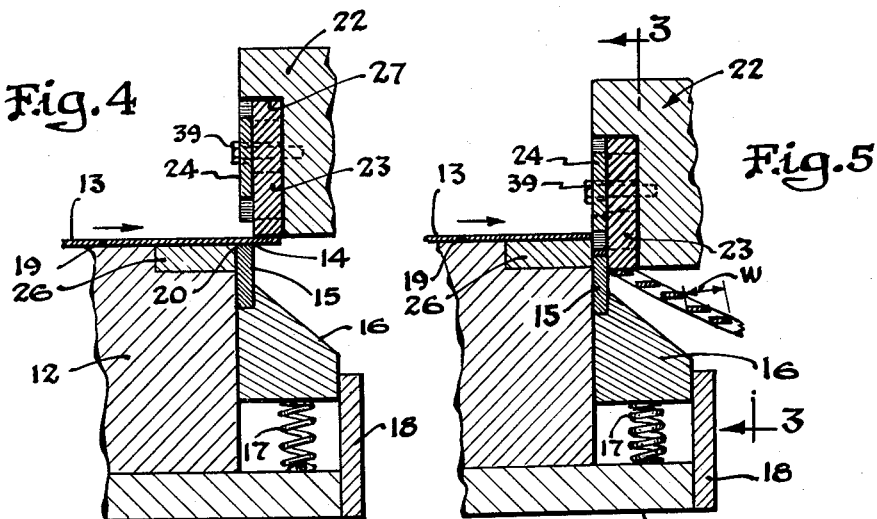
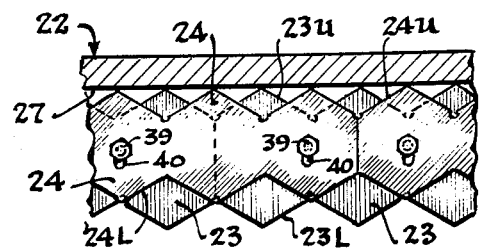
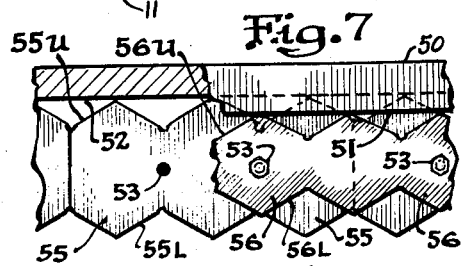
Inventor
John P. Halada
By Wallace and Cannon
Attorneys

3,011,244
APPARATUS FOR PRODUCING
EXPANDED METAL

John P. Halada, Pittsburgh, Pa., assignor to American Brake Shoe Company, New York, N.Y., a corporation of Delaware
Filed Mar. 16, 1959, Ser. No. 799,613
2 Claims. (Cl. 29—6.2)

This invention is directed to a method and apparatus for producing expanded metal.

It is conventional practice to use a single die forming element in conjunction with a fixed shear edge for the production of expanded metal. This necessitates, in addition to the vertical reciprocatory movement of the die forming element with respect to the shearing edge, an additional movement of either the die forming element or the sheet of stock material to be expanded in a direction transverse to the direction of the feed of the sheet of stock material at each expanding operation. It has been proposed to add a second die forming element to the first die forming element so as to complete the formation of the expanded metal quadrilateral formed during the expansion process without necessitating such a transverse shifting of the die forming elements with respect to the sheet of stock material. The additional die forming element of course requires an additional shearing blade and in the prior art the additional shearing blade has been mounted in an assembly permitting the shearing blade to be removed from the area of the expansion process after its shearing function has been performed. This has required complex assemblies which have utilized cams for supporting the additional shear blade in timed relationship with the movement of the die forming elements. The use of cams has entailed the related problem of maintaining sufficient accuracy both in the initial formation and during the useful life of the cam. It is a primary object of the present invention to obviate the need for such complex structure as required by the prior art by providing a floating shearing bar.

It is another object of this invention to permit increased speed of forming expanded metal through the use of multiple die forming elements while maintaining relative simplicity of parts in an operating mechanism.

Other and further objects of the present invention will be apparent from the following description and claims and are illustrated in the accompanying drawings, which, by way of illustration, show preferred embodiments of the present invention and the principle thereof and what is now considered to be the best mode contemplated for applying this principle. Other embodiments of the invention embodying the same or equivalent principles may be used and structural changes may be made as desired by those skilled in the art without departing from the present invention and the purview of the appended claims.

In the drawings:

FIG. 1 is a side elevation of a machine constructed in accordance with the present invention;

FIG. 2 is an enlarged perspective view of the machine shown in FIG. 1;

FIG. 2A is a fragmentary sectional detail showing the relation of certain parts;

FIG. 3 is a detailed perspective view of the FIG. 1 machine and taken in the direction of the arrows 3—3 in FIG. 5, showing the die forming elements in the position assumed subsequent to the first expanding operation and just prior to the second expanding operation;

FIG. 4 is a partial sectional view showing the die forming elements and shearing elements in their operative relation just prior to the first expanding operation;

FIG. 5 is a partial sectional view showing the die forming elements and the shearing elements in their operative relation at the conclusion of the second expansion operation;

FIG. 6 is a schematic view showing details of the assembly of the die forming elements within a supporting head;

FIG. 7 is a schematic view showing details of the assembly of die forming elements within a modified supporting head, wherein a portion of the head is broken away; and FIG. 8 is an enlarged perspective view of the supporting head of the FIG. 7 assembly.

Referring now to FIGS. 1 and 2, a base plate 11 provides a support for a bed 12 mounted thereon. The stock material 13 to be formed into expanded metal is unrolled from the roll 13R and advancing means, not shown, are provided for advancing the material to a forming station to be described. The roll of stock material 13 is progressively advanced along the horizontal upper surface 19 of the bed 12 so as to have a portion extending beyond a shearing edge 14 of a floating shearing element shown as a bar 15. The floating shear bar 15 is mounted in a shear bar head 16 which is supported upon the base plate 11 by a spring 17 or other resilient means. A plate 18 mounted on base plate 11 provides a guide for the vertical reciprocatory movement of the shear bar head 16.

A second shearing edge 20 is provided by an upper edge of a solid shear bar 26 fixed within a recess 25 formed in the bed 12. The shear bar 26 is fixed to the bed 12 by countersunk cap screws or other conventional fastening means which are not illustrated. By incorporating a separate shear bar detachably mounted in a recess, all four edges of the bar are usable as shearing edges. This arrangement presents significant advantages over a single fixed shearing edge formed directly on the bed 12. Thus, higher cost materials, having the properties necessary for a shearing edge, need be utilized for only a small part of the overall structure, and the down time needed for repair or replacement of a shearing edge is kept to a minimum.

The shear bar 15 is also detachably mounted to the shear bar head 16 so that four shearing edges are again available.

It can be seen that with the parts described at rest, as illustrated, the floating shear bar 15 is biased upwardly by the spring 17 so as to have its cutting edge substantially in the plane of the horizontal path 19.

A die supporting head 22 is disposed above the floating shear bar assembly and has a recess 27 formed therein which provides a mount for two knives or die forming elements 23 and 24 that are operative to expand the sheet 13 in a manner to be explained. The die forming elements have saw-tooth upper and lower faces 23U, 24U and 23L, 24L as indicated in FIG. 6. The second die forming element 24 is mounted on the die head 22 in abutting relation with the first die forming element so as to have its lower face 24L projected directly above the shear bar 15. It can be seen from an inspection of FIGS. 2 and 6 that the lower-most points of the saw teeth of the die forming element 24 are aligned with the upper-most part of the recesses between the teeth of the first die forming element 23. The lower face 24L of the die forming element 24 is also vertically offset from the lower face 23L of the die forming element 23.

Advantageously, the sheet of stock material 13 is held stationary by a positive force during the time that the die head elements are effective in shearing and expanding the free marginal edge of the stock material projecting beyond the cutting edge 14. In accordance with the present invention such positive holding force is exerted by a holding bar 33, FIGS. 1 and 2, which is supported above the upper surface 19 of the bed 12. Such support is afforded by an arm or beam 34 having one end connected in any desired fashion to the die head 22. The opposite end of the beam 34 has a rod 35 secured thereto so that the rod 35 is arranged in depending relation. A relative sturdy coil spring 36 is arranged concentrically about rod 35, and the holder 33 is secured to the lower end of the rod 35 in such a manner that the lower end portion of the rod 35 normally projects part way into a recess 35R in the holder 33. This normal condition is a condition wherein the holder 33 is retracted with the die head at the time when the die head is ineffective. Thus, for example, as shown in FIG. 2A, the lower end portion of the rod 35 that is disposed in the recess 35R is provided with an elongated slot 35S that commences at a point spaced slightly upward from the lowermost end of the rod. The holder 33 carries a pin 33P and the pin 33P is disposed in the slot 35S. Therefore when the die head is lowered during an effective stroke, just prior to engagement of the die forming element with the sheet of stock material, the lower surface of the holder bar 33 effectively engages the stock 13 rearward of the recess 25 mentioned above and retains the sheet of stock material in fixed relation with surface 19 of the bed 12. In this manner a positive holding force is exerted on the stock 13, and the coil spring 36 and recess 35R cooperate to enable the plunger 35 to move downward during the remaining part of the effective stroke of the die head 22.

It is necessary that the sheet of stock material 13 be supplied to the die forming station in a well-controlled, incremental manner. For this purpose a feeding assembly is illustrated at 70. This assembly comprises a pair of clamping dogs 71 and 72 which are slidable on a fixed support. A pneumatically actuated cylinder and piston assembly 75 has a piston rod 76 attached to an actuating lever 77. A pilot valve 78 supplies air to opposite sides of the piston to reciprocate the piston and the clamping dogs toward and away from the die forming station to move the sheet of stock material to the forming station in a step-by-step manner. The pilot valve may be controlled in any suitable manner. It is desirable that two such feeding mechanisms 70 be utilized in a manner such that a feeding unit on one side of the sheet of stock material is substantially aligned with a like unit on the opposite side of the sheet 13.

Referring to FIGS. 3, 4, and 5, the operative relationship of the die forming elements and the shearing elements in various stages of the multiple shearing and expanding process will now be described. Referring first to FIG. 4, the sheet of stock material 13 is shown as having been advanced the distance of one web thickness W of an apex of a completed quadrilateral, see FIGS. 3 and 5, beyond the fixed shearing edge 20, and the shearing and die forming element 23 is shown in initial engagement with the resultant free marginal portion of the stock material 13 projecting beyond the edge 14 of the floating shear bar 15. Upon continued downward movement of the die head 22, as illustrated in FIG. 3, the serrated shearing edge of the first or leading die forming element 23 cooperates with the shearing edge 14 to cut the stock material at spaced intervals along the edge 14 and the lower face 23L of the first die forming element is effective in a known manner to expand the portions so cut. During this cutting and expanding operation, the spring 17 exerts sufficient force on the shear bar head 16 to maintain the first shearing edge 14 at the level of the surface 19 and so permits the completion of the first cutting and expanding operation prior to beginning of the second expanding operation. With continued downward movement of the die head 22, the lower face 24L of the second or trailing die forming element 24 engages the portion of the stock material projecting above the shear bar 14, and, as sufficient force is exerted on the die head 22 to overcome the bias of the spring 17, the shear bar 14 is moved below the level of the fixed shearing edge 20, and a second shearing and expanding process is performed in a manner similar to that described with relation to the first die forming element 23. At the conclusion of the second expanding operation the parts are as shown in FIG. 5. The die head 22 is then returned to its uppermost position and the sheet of stock material is advanced another web thickness W beyond the fixed shearing edge 20 and a second multiple expansion operation may be made. No transverse movement of the die forming elements 23, 24 with respect to the sheet of stock material is required, for, as can be seen from an inspection of FIG. 3, a series of complete quadrilaterals are formed in the sheet of stock material by one downward movement of the die head 22.

It can be seen by inspection of FIGS. 4 and 5 that the width of the first die forming element 23 can be of any width greater than a width equal to one-half the thickness of the web of the completed expanded metal quadrilateral. To maintain uniform dimensions in the width of each side of the quadrilateral, the width of the die forming element 24 and the width of the shear bar 15 must be exactly equal to one-half the thickness of the web W of an apex of completed quadrilateral.

Since both the die forming elements 23 and 24 have cutting and forming portions at both their upper and lower faces, these die forming elements may be reversed in their mounting to present new forming edges. For this purpose, and for the purpose of being able to remove the die forming elements for sharpening, cap screws 39 are provided for removably mounting the die forming elements in the die head.

With the recess 27 formed in the die supporting head 22, as illustrated in FIGS. 1 through 6, elongated slotted guides 40 are formed in the central portion of the trailing die forming element 24. These slots 40 permit the uppermost points of the face 24U of the element 24 to abut the face of recess 27 so as to provide a fixed bearing surface for the element 24. When the elements 23 and 24 are reversed, the elongated slots 40 permit the points of the serrated face 24L also to be shifted into abutting relation with the face of recess 27. It will be recognized that no elongated slots need be provided for the element 23 since the mounting holes within the element 23 are centrally located and the element 23 is of a greater height than the element B so as to provide the necessary projection of the saw teeth below the lower face of the die 24.

FIGS. 7 and 8 illustrate an embodiment of the die supporting head wherein a modified recessed construction is provided to obviate the need for providing slotted guides 40 in the trailing die forming element such as in the FIG. 6 embodiment.

Referring first to FIG. 8, a die supporting head 50 is provided with a first recess portion 51 and a second vertically offset recess portion 52.

Referring now to FIG. 7, it may be seen that both the leading die forming element 55 and the trailing die forming element 56 have apertures formed along the longitudinal center line of the respective die forming elements. Thus, the die forming elements 55 and 56 have saw tooth upper and lower faces 55U—55L and 56U—56L, and when a cap screw 53 or other fastening means is inserted through the apertures and into the tapped holes 57 formed in the supporting head 50, the leading die forming element is positioned to have the uppermost points of the face 55U in abutting relation with the recess 52, and the uppermost points of the face 56U of the element trailing die forming element 56 will be disposed in abutting relation with the face of the recess 51.

It will be apparent that by virtue of the medial location of the cap screw receiving apertures the elements 55 and 56 may be reversed within the mounting and still be maintained in a firm bearing relation with the recesses 51 and 52 without the necessity of elongated slots such as 40 as shown in the FIG. 6 embodiment.

It should be noted that with either embodiment the die forming elements have a firm bearing area with the die supporting head at both their rear faces and upper faces.

Thus, from the above description it will be seen that a method and apparatus has been disclosed that permits the production of expanded metal in a simple and highly efficient manner by a floating shear bar that cooperates with a pair of juxtaposed die forming elements which can be advantageously adjusted and reversed if needed. Additionally, the stock material during an expansion operation is held stationary by a member which is lowered with the die head to engage the sheet of stock material.

Hence, while I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. Apparatus for the production of expanded metal comprising a bed disposed in a horizontal plane and affording a horizontal path for a sheet of stock material that is to be progressively formed into the expanded metal at its leading edge, a first shearing element rigidly fixed to the bed and disposed at the level of the plane of the bed, a second floating shearing element having a cutting edge on one face and having another face in slidable contact with the leading face of the first shearing element, resilient means tending to maintain the floating shearing element at the level of the plane of the bed, means for advancing the sheet of stock material to position a portion of the stock material beyond the cutting edge of the floating shearing element, a compound shearing and expanding die disposed above the first and second shearing elements and arranged for vertical reciprocatory movement, a first forming face on said die being disposed above the portion of the stock material projecting beyond the cutting edge of the floating shearing element, a second forming face on said die vertically offset from said first forming face and disposed above the portion of the stock material overlying the floating shearing element, and means for engaging progressively the first forming face with the portion of the stock material extending beyond the cutting edge of the second shearing element in a first expanding operation and the second forming face with the portion of the stock material overlying the floating shearing element in a second expanding operation, said resilient means exerting sufficient force to maintain the second shearing edge at the level of the first shearing edge during the first expanding operation while permitting depression of the second shearing edge below the first shearing edge during the second expanding operation.

2. Apparatus for the production of expanded metal comprising a bed disposed in a horizontal plane and affording a horizontal path for a sheet of stock material that is to be progressively formed into the expanded metal at its leading edge, a first shearing element rigidly fixed to the bed and disposed at the level of the plane of the bed, a second floating shearing element having a cutting edge on one face and having another face in slidable contact with the leading face of the first shearing element, resilient means tending to maintain the floating shearing element at the level of the plane of the bed, means for advancing the sheet of stock material to a position a portion of the stock material beyond the cutting edge of the floating shearing element, a compound shearing and expanding die disposed above the first and second shearing elements and arranged for vertical reciprocatory movement, a first forming face on said die being disposed above the portion of the stock material projecting beyond the cutting edge of the floating shearing element, a second forming face on said die vertically offset from said first forming face and disposed above the portion of the stock material overlying the floating shearing element, means for engaging progressively the first forming face with the portion of the stock material extending beyond the cutting edge of the second shearing element in a first expanding operation and the second forming face with the portion of the stock material overlying the floating shearing element in a second expanding operation, said resilient means exerting sufficient force to maintain the second shearing edge at the level of the first shearing edge during the first expanding operation while permitting depression of the second shearing edge below the first shearing edge during the second expanding operation, and stop means operative concurrently with said last named means for retaining the sheet of stock material in a fixed position on the horizontal bed during said forming operations.

References Cited in the file of this patent

UNITED STATES PATENTS

| | | |
|---|---|---|
| 594,172 | Duncan et al. | Nov. 23, 1897 |
| 639,157 | Duncan | Dec. 12, 1899 |
| 792,723 | McKay | June 20, 1905 |
| 2,322,204 | Ballard | June 22, 1943 |
| 2,671,361 | Sandberg | Mar. 9, 1954 |
| 2,811,880 | Williams | Nov. 5, 1957 |

FOREIGN PATENTS

| | | |
|---|---|---|
| 517,296 | Germany | Feb. 2, 1931 |